(12) United States Patent
Bieg et al.

(10) Patent No.: US 8,042,835 B2
(45) Date of Patent: Oct. 25, 2011

(54) BELT TENSIONER FOR A SAFETY BELT SYSTEM

(75) Inventors: Wilfried Bieg, Eschach (DE); Thomas Moedinger, Alfdorf (DE); Dominik Seitz, Schwaebisch Gmuend (DE); Oliver Gross, Schwaebisch Gmuend (DE)

(73) Assignee: TRW Automotive GmbH, Alfdorf (DE)

( * ) Notice: Subject to any disclaimer, the term of this patent is extended or adjusted under 35 U.S.C. 154(b) by 395 days.

(21) Appl. No.: 11/728,894

(22) Filed: Mar. 27, 2007

(65) Prior Publication Data
US 2007/0241550 A1 Oct. 18, 2007

(30) Foreign Application Priority Data

Apr. 3, 2006 (DE) .................... 20 2006 005 334 U
Jul. 6, 2006 (DE) ......................... 10 2006 031 369

(51) Int. Cl.
B60R 22/36 (2006.01)
(52) U.S. Cl. ........................................ 280/806; 297/480
(58) Field of Classification Search .................. 280/806; 297/480
See application file for complete search history.

(56) References Cited

U.S. PATENT DOCUMENTS

| 4,230,288 | A | 10/1980 | Fohl |
| 4,444,010 | A | 4/1984 | Bendler |
| 5,881,962 | A | 3/1999 | Schmidt et al. |
| 6,019,305 | A * | 2/2000 | Palliser .......................... 242/374 |
| 6,722,600 | B2 * | 4/2004 | Hamaue et al. ............... 242/374 |
| 2004/0245361 | A1 | 12/2004 | Specht |
| 2009/0261567 | A1 * | 10/2009 | Bieg et al. ..................... 280/806 |

FOREIGN PATENT DOCUMENTS

| DE | 2814487 | 10/1979 |
| DE | 2931164 | 2/1981 |
| DE | 9308273.8 | 9/1993 |
| DE | 4422980 | 1/1996 |
| DE | 19602549 | 8/1996 |
| DE | 10325583 | 1/2005 |
| DE | 102004002424 | 8/2005 |
| GB | 2323016 | 9/1998 |
| JP | 11255074 | 9/1999 |

* cited by examiner

Primary Examiner — Eric Culbreth
(74) Attorney, Agent, or Firm — Tarolli, Sundheim, Covell & Tummino LLP

(57) ABSTRACT

A belt tensioner for a safety belt system has a drive unit and a power transmission element, which engages on a drive element when the drive unit is activated. The power transmission element is a non-rigid medium.

20 Claims, 2 Drawing Sheets

BELT TENSIONER FOR A SAFETY BELT SYSTEM

TECHNICAL FIELD

The invention relates to a belt tensioner for a safety belt system.

BACKGROUND OF THE INVENTION

Belt tensioners are known that have a drive unit and a power transmission element, which engages on a drive element when the drive unit is activated. Several balls arranged in a row serve for example as the power transmission element, these balls being initially stored in a tube and being acted upon by a high pressure when a gas generator, which constitutes the drive unit, is activated. The balls are thereby pushed forward out of the tube and drive the drive element, which is coupled to the belt spool.

The invention provides a belt tensioner which is distinguished by a particularly simple method of manufacture, a low weight and a variable and therefore space-saving housing in the vehicle.

BRIEF SUMMARY OF THE INVENTION

According to the invention, a belt tensioner has a drive unit and a power transmission element, which engages on a drive element when the drive unit is activated. The power transmission element is a non-rigid medium. This is understood to mean a medium the outer form of which is changeable at least in so far as it can adapt to any desired profiles of a guide tube and therefore almost any desired fashioning of the belt tensioner, i.e. for example an elastically deformable medium. The medium here preferably has a constant cross-section over its entire length and should be able to almost completely fill an associated guide tube. In particular, the non-rigid medium is not composed of several rigid bodies (such as steel balls, for instance) arranged in series. Neither is the non-rigid medium a gas generated by a gas generator. The power transmission element used in the belt tensioner according to the invention has, in addition, a low weight due to the material, and is thereby particularly fast.

A particularly compact type of construction of the belt tensioner according to the invention can be achieved if the drive element is movable on a circular path.

The drive unit advantageously comprises a pyrotechnic drive which guarantees a particularly rapid response of the belt tensioner. Alternatively, however, an electric or mechanical drive could also be used, which acts on the power transmission element and accelerates it.

Preferably, a guide is provided for the power transmission element, which has a curved first portion which at least partially surrounds the circular path. Thereby, a particularly compact type of construction is achieved, especially since the power transmission element, due to its non-rigid design, can adapt without difficulty to the curvature of the guide.

A second portion of the guide is constructed in particular as a hollow section to receive the power transmission element before the drive unit is activated. This second portion may likewise have a curved profile, but may also be constructed straight and be arranged for example in the region of the B column of the vehicle.

A particularly simple development is produced in that the drive element has a wing extension which is arranged in the first portion of the guide. The power transmission element engages thereon when the drive unit is activated, and thereby causes a rotation of the drive element.

Particularly when a pyrotechnic drive is used which generates a compressed gas, at least one seal is to be provided which seals between the power transmission element and the guide.

According to a first embodiment of the invention, the non-rigid medium is an elastic solid, particularly an elastomer or thermoplastic. For example NBR (nitrile butadiene rubber) may be used. The preferred materials are comparatively light and insensitive and can adapt to different guide paths. Compared with a conventional ball tensioner, such an elastic solid offers the advantage that several balls do not have to be inserted. The seal which is necessary is also substantially simpler to achieve.

According to one variant, the seal is arranged on the guide in a transition region between the first and the second portion. The seal here is immovable relative to the guide, and therefore does not move with the power transmission element, whereby the sealing is facilitated.

In this development, the power transmission element preferably has a smaller cross-section than the hollow section. Therefore, when a pyrotechnic drive is activated, almost the entire power transmission element is acted upon by the generated compressed gas (with the exception of a front end face which is arranged outside the pressure chamber delimited by the seal). A pressure differential occurs here between the front and the rear end faces of the power transmission element, which brings about a force which "draws out" the power transmission element from the pressure chamber. Through this development, a bending of the elastic power transmission element is prevented, and almost no friction losses occur between the power transmission element and the hollow section.

According to a further embodiment, the medium is a fluid, particularly water, oil or gel. This is non-compressible, i.e. is suitable as a power transmission element and adapts itself to any desired form of an associated guide.

A further embodiment of the invention provides solid body particles as the medium, particularly a granulate or sand. The particles here have dimensions which are very small compared with the diameter of an associated guide. Such a medium has similar characteristics to a fluid.

In order to prevent a liquid medium or a medium in particle form from emerging from the associated guide, at least one flexible or elastic sealing element can be provided which is arranged at an end of the power transmission element facing the drive element and/or an end of the power transmission element facing away from the drive element.

The sealing element preferably moves with the power transmission element on activation of the drive unit, and therefore makes provision that the power transmission element does not distribute itself arbitrarily inside the guide.

The drive element is preferably coupled or able to be coupled to a pinion, the rotation axis of which is offset with respect to the central point of the circular path. In this way, a direct engagement of the drive element with the pinion can be realized even with a comparatively large radius of the circular path, which corresponds to a large tensioning course. Alternatively, of course, a planetary gear may also be used. Likewise, it would be conceivable to construct the drive element as a straight rack which moves on a straight path and is in direct engagement with a pinion.

DETAILED DESCRIPTION OF THE PREFERRED EMBODIMENTS

Figure 1:
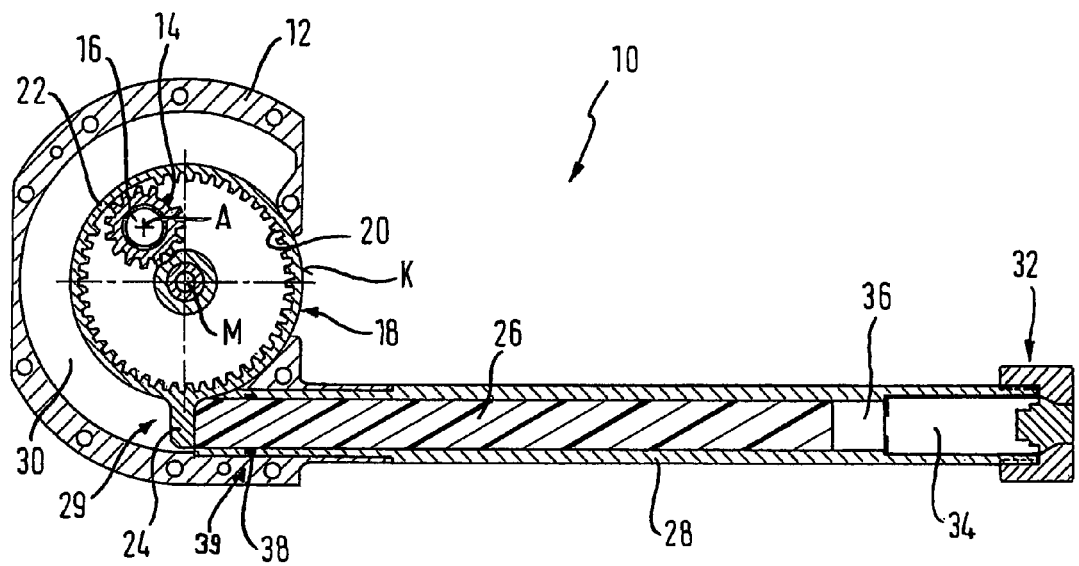
FIG. 1 shows a sectional view of a belt tensioner according to a first embodiment of the invention in the assembled state.

FIG. 1 shows a belt tensioner 10 according to a first embodiment of the invention. The belt tensioner 10 has a housing 12 which is connected with a frame or housing of a belt retractor which is not shown in the figure, in particular being constructed integrally therewith. A pinion 14, which is connected so as to be locked against relative rotation with a shaft 16 of the belt retractor, is rotatably mounted in the housing 12. Alternatively to the development which is shown, the pinion 14 may only be coupled to the shaft 16 as required, namely when the belt tensioner 10 is activated. The rotation axis of the pinion 14 (and, at the same time also, of the shaft 16) is designated by A.

In addition, a drive element 18 is provided, the teeth 20 of which can mesh with the pinion 14. The drive element 18 here is a ring gear which can move on a circular path K (which coincides with the periphery of the ring gear) about the central point M, in order to drive the pinion 14. Alternatively, the drive element 18 may also have the shape of a circular arc, for instance of a quadrant arc. As can be seen from the figure, the centre M of the circular path K does not coincide with the rotation axis A of the pinion 14. In order to make possible an unimpeded rotation of the shaft 16 of the belt retractor in the normal operation of the belt retractor before the belt tensioner 10 is activated, no teeth are provided in a region 22 of the drive element 18 which is situated in the immediate vicinity of the pinion 14 in the assembled state of the belt tensioner 10.

Figure 2:
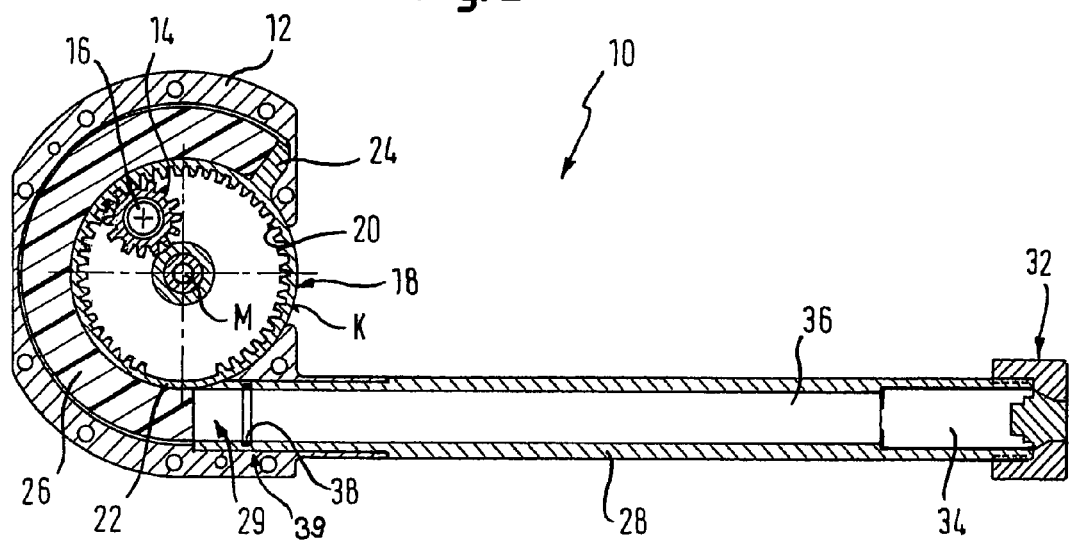
FIG. 2 shows a sectional view of the belt tensioner of FIG. 1 after completion of a tensioning process.

The drive element 18 has a wing extension 24, which points radially outwards, viewed from the central point M. In addition, a power transmission element 26, here in the form of an elastically deformable or flexible solid (e.g. NBR or another elastomer or thermoplastic) is provided, which is arranged inside a hollow section 28 in the assembled state. The hollow section forms a second portion of a guide 29, the first portion 30 of which is curved, in particular is constructed here in the form of a circular arc, and at least partially surrounds the circular path K. The wing extension 24 is arranged in the first section 30 of the guide. The hollow section 28, which has a square or circular cross-section, may be constructed so as to be straight (as shown in FIGS. 1 and 2) or, alternatively, curved. Theoretically, the hollow section 28, like the remainder of the guide 29, may have any desired course, to which the elastic power transmission element 26 adapts itself.

The end of the hollow section 28 facing away from the wing extension 24 is in flow connection with a drive unit 32 which comprises a pyrotechnic drive 34. When the drive unit 32 is activated, a compressed gas is generated which fills the hollow section 28, the interior of which serves as pressure chamber 36.

In the embodiment which is shown, the power transmission element 26 has a smaller cross-section than the hollow section 28. A seal 38, which seals between the guide 29 and the power transmission element 26, is arranged on the guide 29 in a transition region 39 between the first portion 30 and the second portion in the form of the hollow section 28. Deviating from the development which is shown, a seal could also be arranged at the rear end of the power transmission element 26 facing the pyrotechnic drive 34.

In a case of restraint, the pyrotechnic drive 34 is activated and generates a compressed gas which fills the pressure chamber 36, which extends here almost over the entire length of the hollow section 28 up to the seal 38, and acts upon the power transmission element 26. Owing to the pressure difference at the two end faces of the power transmission element 26, a driving force is exerted onto the latter, which moves the power transmission element 26 out from the hollow section 28, which in turn causes the drive element 18 to rotate. In so doing, the teeth 20 of the drive element 18 come into engagement with the pinion 14 and turn the latter, and therefore the shaft 16 of the belt retractor. The belt webbing is drawn in.

FIG. 2 shows the belt tensioner 10 after completion of the tensioning movement. As the power transmission element 26 is a non-rigid medium, it can adapt itself without difficulty to the first section 30 of the guide 29 which is in the form of a circular arc.

Figure 3:
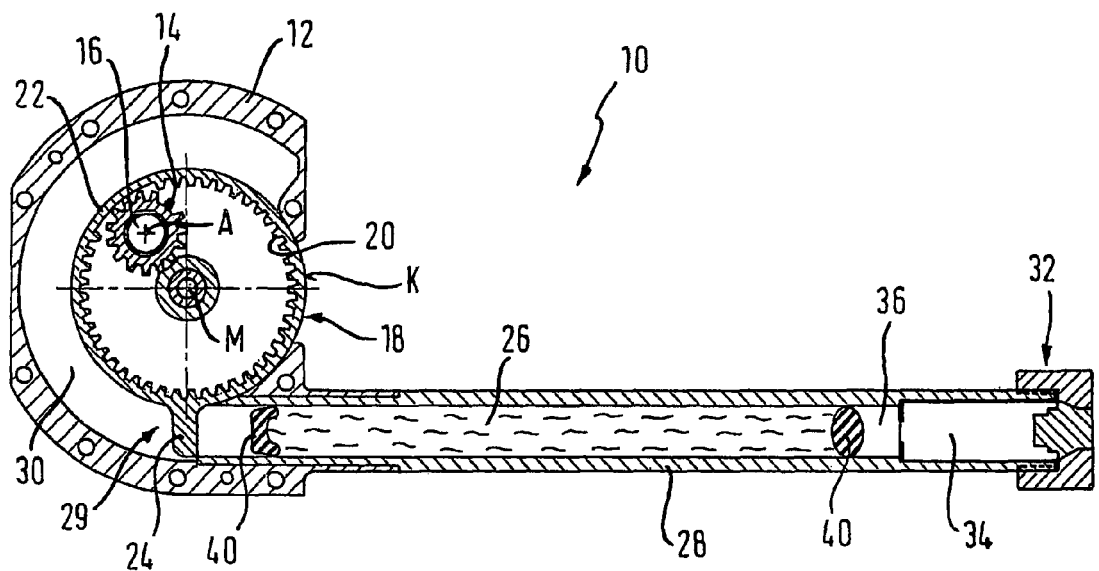
FIG. 3 shows a sectional view of a belt tensioner according to a second embodiment of the invention in the assembled state.
Figure 4:
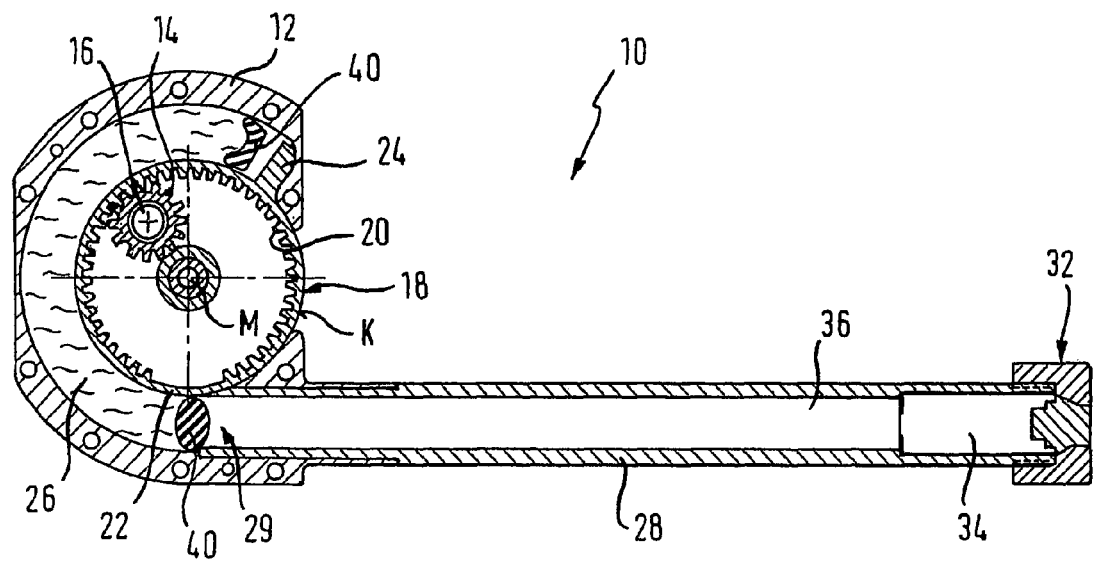
FIG. 4 shows a sectional view of the belt tensioner of FIG. 3 after completion of a tensioning process.

FIGS. 3 and 4 show a belt tensioner 10 according to a second embodiment of the invention. Components which are identical or have an identical function bear the same reference numbers below, and only the differences from the first embodiment are described in detail.

In the belt tensioner of FIGS. 3 and 4, a fluid, e.g. water, oil or gel, or a collection of solid body particles (e.g. a granulate or sand) is used as the power transmission element 26. To prevent this medium from distributing itself in an uncontrolled manner inside the guide 29, elastic or flexible sealing elements 40 are provided both on the end of the power transmission element 26 facing the drive element 18 and facing away from the drive element 18. These may be permanently elastic shaped parts, flexible balls or kneadable stoppers. As can be seen in particular from FIG. 4, the two sealing elements 40 move with the power transmission element 26 on activation of the drive unit 32, and therefore provide for a reliable seal. A further difference from the belt tensioner of FIGS. 1 and 2 consists in that only the space between the rear end of the power transmission element 26 and the pyrotechnic drive 34 constitutes a pressure chamber 36 which becomes larger when the power transmission element 26 moves.

The invention claimed is:

1. A belt tensioner for a safety belt system, comprising a drive unit (32) and;
   a one-piece power transmission element (26), which engages on and moves a drive element (18) when the drive unit (32) is activated, the power transmission element (26) engaging the drive element (18) through the entire path of movement of the drive element (18),
   the power transmission element (26) being a non-rigid medium, the medium being an elastic solid, the power transmission element (26) having a constant cross-section over its entire length and being received in a hollow section of a guide (29), said guide having a first portion (30) and a second portion (28), said second portion (28) of the guide receiving the power transmission element (26) before the drive unit (32) is activated and being at least substantially filled by said power transmission element (26) before the drive unit (32) is activated.

2. The belt tensioner according to claim 1, wherein the drive element (18) is movable on a circular path (K).

3. The belt tensioner according to claim 2, wherein the first portion (30) is curved and at least partially surrounds the circular path (K).

4. The belt tensioner according to claim 3, wherein the drive element (18) has a wing extension (24) which is arranged in the first portion (30) of the guide (29).

5. The belt tensioner according to claim 3, wherein at least one seal (38) is provided which seals between the power transmission element (26) and the guide (29).

6. The belt tensioner according to claim 2, wherein the drive element (18) is one of coupled and able to be coupled to a pinion (14), a rotation axis (A) of which is offset with respect to a central point (M) of the circular path (K).

7. The belt tensioner according to claim 1, wherein the drive unit (32) comprises a pyrotechnic drive (34).

8. The belt tensioner according to claim 1, wherein the elastic solid is one of an elastomer and a thermoplastic.

9. The belt tensioner according to claim 5, wherein the seal (38) is arranged on the guide (29) in a transition region (39) between the first portion and the second portion of the guide (29).

10. A belt tensioner for a safety belt system, comprising a drive unit (32) and;
a one-piece power transmission element (26), which engages on a drive element (18) when the drive unit (32) is activated,
the power transmission element (26) being a non-rigid medium, the medium being an elastic solid, the power transmission element (26) having a constant cross-section over its entire length and being received in a hollow section of a guide (29), said guide having a first portion (30) and a second portion (28), said second portion (28) of the guide receiving the power transmission element (26) before the drive unit (32) is activated and being at least substantially filled by said power transmission element (26) before the drive unit (32) is activated, wherein the power transmission element (26) has a smaller cross-section than the hollow section (28).

11. A belt tensioner for a safety belt system, comprising a drive unit (32) and;
a one-piece power transmission element (26), which engages on a drive element (18) when the drive unit (32) is activated,
the power transmission element (26) being a non-rigid medium, the medium being an elastic solid, the power transmission element (26) having a constant cross-section over its entire length and being received in a hollow section of a guide (29), said guide having a first portion (30) and a second portion (28), wherein the second portion (28) of the guide extends from the drive unit (32) to the drive element (18), said second portion (28) of the guide receiving the power transmission element (26) before the drive unit (32) is activated and being at least substantially filled by said power transmission element (26) before the drive unit (32) is activated.

12. The belt tensioner according to claim 11, wherein the cross-section of the power transmission element (26) is substantially the same as a cross-section of the guide.

13. The belt tensioner according to claim 11, wherein the drive element (18) is movable on a circular path (K).

14. The belt tensioner according to claim 13, wherein the first portion (30) is curved and at least partially surrounds the circular path (K).

15. The belt tensioner according to claim 14, wherein the drive element (18) has a wing extension (24) which is arranged in the first portion (30) of the guide (29).

16. The belt tensioner according to claim 14, wherein at least one seal (38) is provided which seals between the power transmission element (26) and the guide (29).

17. The belt tensioner according to claim 16, wherein the seal (38) is arranged on the guide (29) in a transition region (39) between the first portion and the second portion of the guide (29).

18. The belt tensioner according to claim 13, wherein the drive element (18) is one of coupled and able to be coupled to a pinion (14), a rotation axis (A) of which is offset with respect to a central point (M) of the circular path (K).

19. The belt tensioner according to claim 11, wherein the drive unit (32) comprises a pyrotechnic drive (34).

20. The belt tensioner according to claim 11, wherein the elastic solid is one of an elastomer and a thermoplastic.

* * * * *